(12) United States Patent
Shirgaonkar

(10) Patent No.: US 8,336,057 B2
(45) Date of Patent: Dec. 18, 2012

(54) METHOD AND SYSTEM FOR AUTOMATICALLY GENERATING MESSAGE QUEUE SCRIPTS

(75) Inventor: Kiran Ramchandra Shirgaonkar, Maharashtra (IN)

(73) Assignee: Infosys Technologies Limited (IN)

( * ) Notice: Subject to any disclaimer, the term of this patent is extended or adjusted under 35 U.S.C. 154(b) by 519 days.

(21) Appl. No.: 12/567,903

(22) Filed: Sep. 28, 2009

(65) Prior Publication Data

US 2010/0083278 A1   Apr. 1, 2010

(30) Foreign Application Priority Data

Sep. 29, 2008   (IN) .......................... 2380/CHE/2008

(51) Int. Cl.
*G06F 3/00* (2006.01)
(52) U.S. Cl. ....................................................... 719/314
(58) Field of Classification Search .................. 719/313, 719/314
See application file for complete search history.

(56) References Cited

U.S. PATENT DOCUMENTS

| | | | | |
|---|---|---|---|---|
| 6,760,414 | B1 * | 7/2004 | Schurko et al. | 705/36 R |
| 7,174,556 | B2 * | 2/2007 | Lambert | 719/315 |
| 7,640,320 | B2 * | 12/2009 | Madison et al. | 709/219 |
| 7,752,208 | B2 * | 7/2010 | Amitay et al. | 707/749 |
| 8,065,684 | B2 * | 11/2011 | Arts et al. | 719/314 |
| 2008/0267387 | A1 * | 10/2008 | Strathmeyer et al. | 379/265.09 |

OTHER PUBLICATIONS

Robert Henjes, Throughput Performance of Java Messaging Services Using Sun Java System Message Queue, 2006.*

* cited by examiner

*Primary Examiner* — Lechi Truong
(74) *Attorney, Agent, or Firm* — Cantor Colburn LLP

(57) ABSTRACT

The present invention provides a method, system and computer program product for automatically generating message queue scripts for defining one or more Websphere® Message Queue™ (WMQ) objects on one or more queue managers. A user provides parameters corresponding to the WMQ objects as input in an input parameter file. The parameters include the name of the WMQ objects and the queue managers. Further, a message queue environment consistency check is performed on the input parameter file for validating the parameters provided. The validation is performed by using a database that stores information about the message queue environment. After successful validation of the input parameter file, one or more message queue scripts are generated for defining the WMQ objects on the queue managers. Fallback scripts may also be generated for rolling back the modifications performed on the queue managers, if required at a later stage.

18 Claims, 15 Drawing Sheets

FIG. 5a

| Queue Manager | Cluster 1 | Cluster 2 | Cluster 3 |
|---|---|---|---|
| AAA | TECLUSTER01 | | |

502 — 504 (TECLUSTER01)

FIG. 5b

| Queue Alias Name | Description | Target Queue Name | Cluster | Defbind | Replace |
|---|---|---|---|---|---|
| Queuealias01 | Alias queue | Queue01 | TECLUSTER01 | | |
| Queuealias02 | Alias queue | Queue02 | TECLUSTER01 | | |

| Queue Local Name | Description | Target Queue Name | Cluster | Defbind | Replace |
|---|---|---|---|---|---|
| Queuelocal01 | Local queue | Queue01 | TECLUSTER01 | | |
| Queuelocal02 | Local queue | Queue02 | TECLUSTER01 | | |

508a, 508b — 510

| REP | Environment 1Clusters | Environment 2 Clusters |
|---|---|---|
| | TECLUSTER01 | PECLUSTER01 |
| | TECLUSTER02 | PECLUSTER02 |
| | TECLUSTER03 | |
| | TECLUSTER04 | |

FIG. 6b

| 1 | REP | TE11 | TE12 | PE11 | PE22 | PE33 |
|---|---|---|---|---|---|---|
| 2 | | 101 | 102 | 201 | 202 | 203 |
| | REP | TE11 | TE12 | PE11 | PE22 | PE33 |
| | | 104 | 105 | 204 | 205 | 206 |
| | KKK | 106 | 107 | 207 | 208 | 209 |
| | MMM | 108 | 109 | 210 | 211 | 212 |
| | AAA | | | | | |

FIG. 6c

| Queue Alias Name | Description | Target Queue Name | Cluster | ClusIL |
|---|---|---|---|---|
| REQUEST.QA | Alias queue for request | REQUEST.INPUT | TECLUSTER01 | |
| 1106 | | 1108 | | |

FIG. 11b

```
***----------------------------------------------------------------***
***                MQ scripts for AAATE11                           ***
***----------------------------------------------------------------***

*----------- Defining channels for TECLUSTER01 cluster -----------*

DEFINE CHANNEL(TECLUSTER01.AAATE11) +
    CHLTYPE(CLUSRCVR) +
    CONNAME('11.11.11(110)') +
    TRPTYPE(TCP) +
    DESCR('Cluster Receiver channel to AAATE11') +
    CLUSTER(TECLUSTER01) +
    DISCINT(900) +
    HBINT(60)

DEFINE CHANNEL(TECLUSTER01.REPTE11) +
    CHLTYPE(CLUSSDR) +
    CONNAME('dns.te.1(1)') +
    TRPTYPE(TCP) +
    DESCR('Cluster Sender to REPTE11') +
    CLUSTER(TECLUSTER01) +
    DISCINT(900) +
    HBINT(60)

DEFINE CHANNEL(TECLUSTER01.REPTE31) +
    CHLTYPE(CLUSSDR) +
    CONNAME('dns.te.2(1)') +
    TRPTYPE(TCP) +
    DESCR('Cluster Sender to REPTE31') +
    CLUSTER(TECLUSTER01) +
    DISCINT(900) +
    HBINT(60)
```

FIG. 13

METHOD AND SYSTEM FOR AUTOMATICALLY GENERATING MESSAGE QUEUE SCRIPTS

BACKGROUND

The present invention relates to message queues. In particular, the present invention relates to generation of Websphere message queue scripts for queue managers in a message queue environment.

Message queuing is a technology which enables inter process communication or inter thread communication within the same process. Websphere® Message Queue™ (WMQ), also referred to as Websphere® MQ™, is a family of network communication products that enables communication between a plurality of processes or applications across different platforms, for example Windows and Linux. WMQ enables applications to communicate through WMQ objects that need to be defined on queue managers in the message queue environment. When applications need to communicate with each other, the applications connect to the queue managers and communicate through the WMQ objects defined on the queue managers. Examples of WMQ objects include queues, channels and namelists.

Currently, WMQ objects are defined manually on a queue manager by executing Message Queue Script (MQSC) commands on the queue manager. The attributes corresponding to the WMQ objects need to be specified using a runmqsc interface in order to define or modify the WMQ objects on a single queue manager. Alternatively, a script file containing MQSC commands may be created manually. The script file is executed on the queue manager through the runmqsc command interface.

However, creation of WMQ objects through the runmqsc interface involves manual effort and is time consuming. Further, fallback scripts need to be generated manually to undo the modifications. Similarly, the queue repositories for clustered object definitions need to be specified manually for every queue manager while creating WMQ objects on the queue manager. Thus, due to the involvement of manual intervention, most of the above mentioned processes become error-prone and too cumbersome to handle.

In light of the above discussion, there is a need for a method and system for automatically generating message queue scripts for queue managers. Further, there is a need to automatically link queue managers with the repositories for clustered object definitions.

SUMMARY

An object of the invention is to automatically generate message queue scripts for defining WMQ objects on queue managers in a message queue environment.

Another object of the invention is to automatically identify queue repositories for the queue managers in the case of clustered object definitions.

Yet another object of the invention is to generate fallback scripts for the message queue scripts for rolling back the modifications performed on the queue managers.

Still another object of the invention is to validate attributes for Websphere® Message Queue™ (WMQ) objects and generate message queue scripts according to the conventions followed in a specific message queue environment.

To achieve the objectives mentioned above, the invention provides a method, system and computer program product for automatically generating message queue scripts for defining one or more WMQ objects on one or more queue managers. A user provides parameters corresponding to the one or more WMQ objects as input in an input parameter file. The parameters may include the names of the WMQ objects, the names of the queue managers, the names of the corresponding clusters and one or more attributes corresponding to the WMQ objects. Further, a message queue environment consistency check is performed on the input parameter file to validate the parameters based on information stored in a database. The validation includes validating cluster definitions provided in the input parameter file. The cluster definitions are validated through cluster repositories identified through the information stored in the database. The validation also includes performing an attribute constraint check on the names of the WMQ objects and their corresponding attributes. The validation is performed according to the conventions followed in the message queue environment. After the input parameter file has been checked for consistency, one or more message queue scripts are generated to define the WMQ objects on the queue managers. Further, fallback scripts are also generated for rolling back the modifications performed on the queue managers.

BRIEF DESCRIPTION OF THE DRAWINGS

The various embodiments of the invention will hereinafter be described in conjunction with the appended drawings, provided to illustrate and not to limit the invention, wherein like designations denote like elements, and in which:

FIG. 5a, FIG. 5b and FIG. 5c illustrate an input parameter file for defining parameters corresponding to one or more Websphere® Message Queue™ (WMQ) objects and one or more queue managers, in accordance with an embodiment of the invention;

FIG. 6a, FIG. 6b and FIG. 6c illustrate a database for storing information about the message queue environment, in accordance with an embodiment of the invention;

FIG. 11a and FIG. 11b is a screenshot of an input parameter file for defining parameters corresponding to the one or more WMQ objects and the one or more queue managers, in accordance with an exemplary embodiment of the invention;

FIG. 13 is a screenshot of a message queue script, in accordance with an exemplary embodiment of the invention.

DETAILED DESCRIPTION OF DRAWINGS

In message queue environments, applications communicate with each other through message queues. The applications may include software programs that need to communicate with each other, for example a Java based user interface may want to communicate with a mainframe based back end program to gather user data in order to process user requests. Message queues are managed by queue managers that provide queuing services to the applications. A cluster in a message queue environment is a network of queue managers. Queue managers in a cluster can communicate with each other without explicit channel definitions and transmission queues. Each cluster in the message queue environment contains at least one repository queue manager holding full repositories of information about the message queues, the queue managers and channels in the cluster.

Websphere® Message Queue™ (WMQ) is a family of network communication products that enables setting up of communication between applications. WMQ objects are defined on queue managers to enable applications to communicate with each other when the applications connect to the queue managers. The attributes of the WMQ objects define the properties of the WMQ objects. WMQ processes the WMQ objects based on the properties. This controls communication between the applications. Examples of WMQ objects include, but are not limited to, queues, channels, namelists and listeners.

The invention describes a method, system and computer program product for generating message queue scripts for queue managers in a message queue environment for defining the WMQ objects on the queue managers. A user defines parameters of one or more WMQ objects in an input parameter file. Thereafter, a message queue environment consistency check is performed on the input parameter file on the basis of information stored in a database. The message queue environment consistency check includes validating the names of the WMQ objects provided in the input parameter file. After the data in the input parameter file is checked for consistency, one or more message queue scripts are generated for the queue managers.

Figure 1:
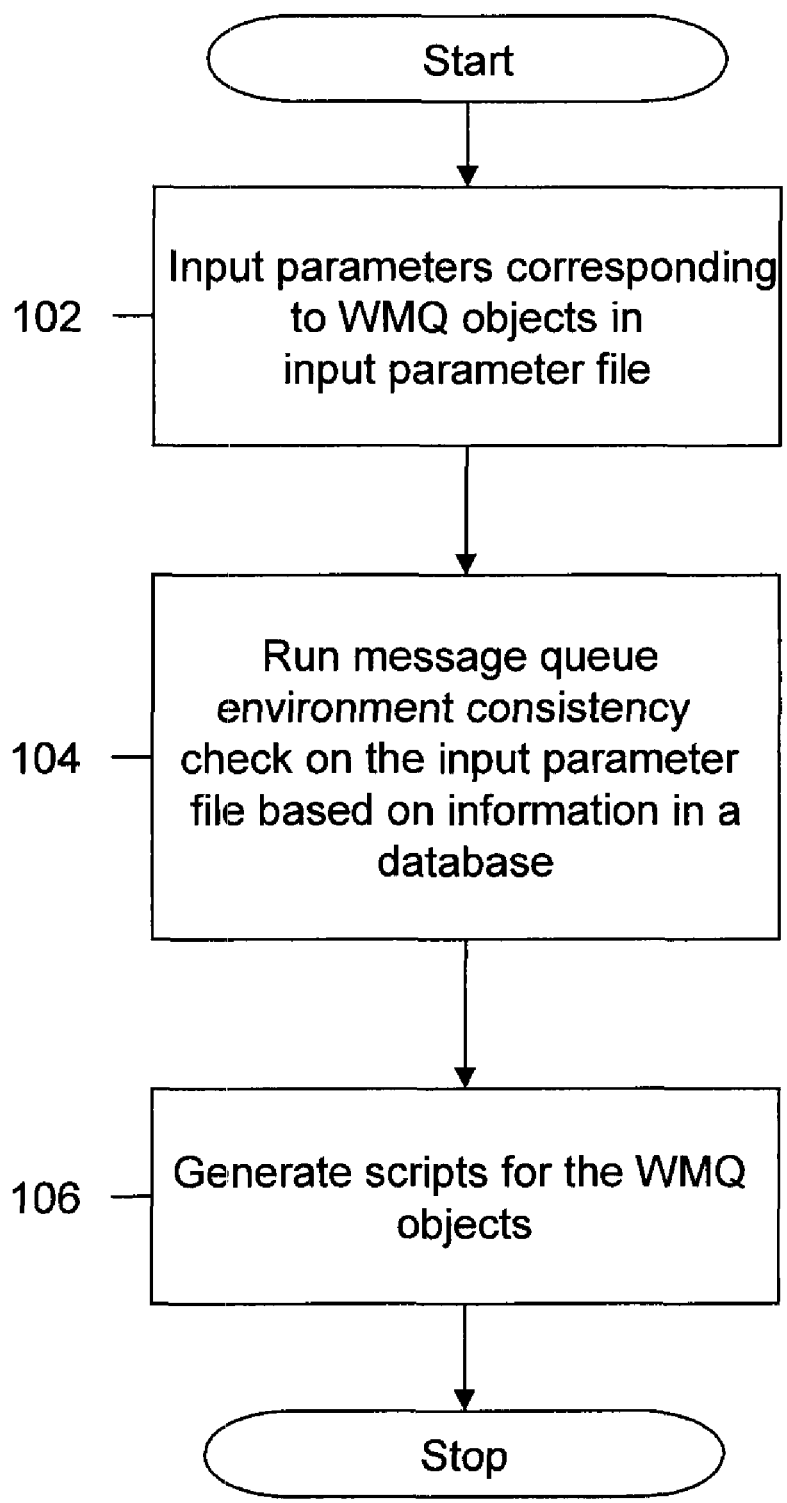
FIG. 1 is a flowchart illustrating a method for generating message queue scripts for one or more queue managers, in accordance with an embodiment of the invention.

FIG. 1 is a flowchart illustrating a method for generating message queue scripts for one or more queue managers, in accordance with an embodiment of the invention. The message queue scripts are generated for defining one or more WMQ objects on one or more queue managers in a message queue environment. At 102, parameters corresponding to the one or more WMQ objects are entered in an input parameter file. In various embodiments of the invention, names and parameters corresponding to the WMQ objects and the queue managers are defined in the input parameter file. The parameters corresponding to the WMQ objects include, but are not limited to, the names of one or more queues for which the WMQ objects need to be defined. In another embodiment of the invention, names of one or more clusters corresponding to the queue managers are also entered in the input parameter file. At 104, a message queue environment consistency check is performed on the input parameter file on the basis of information stored in a database. The message queue environment consistency check may include running an attribute constraint check on the names of the WMQ objects. In another embodiment of the invention, the names of the clusters provided in the input parameter file may also be validated. After the message queue environment consistency check is performed and the input parameter file is validated, at 106, one or more message queue scripts are generated to define the WMQ objects on the queue managers.

Figure 2:
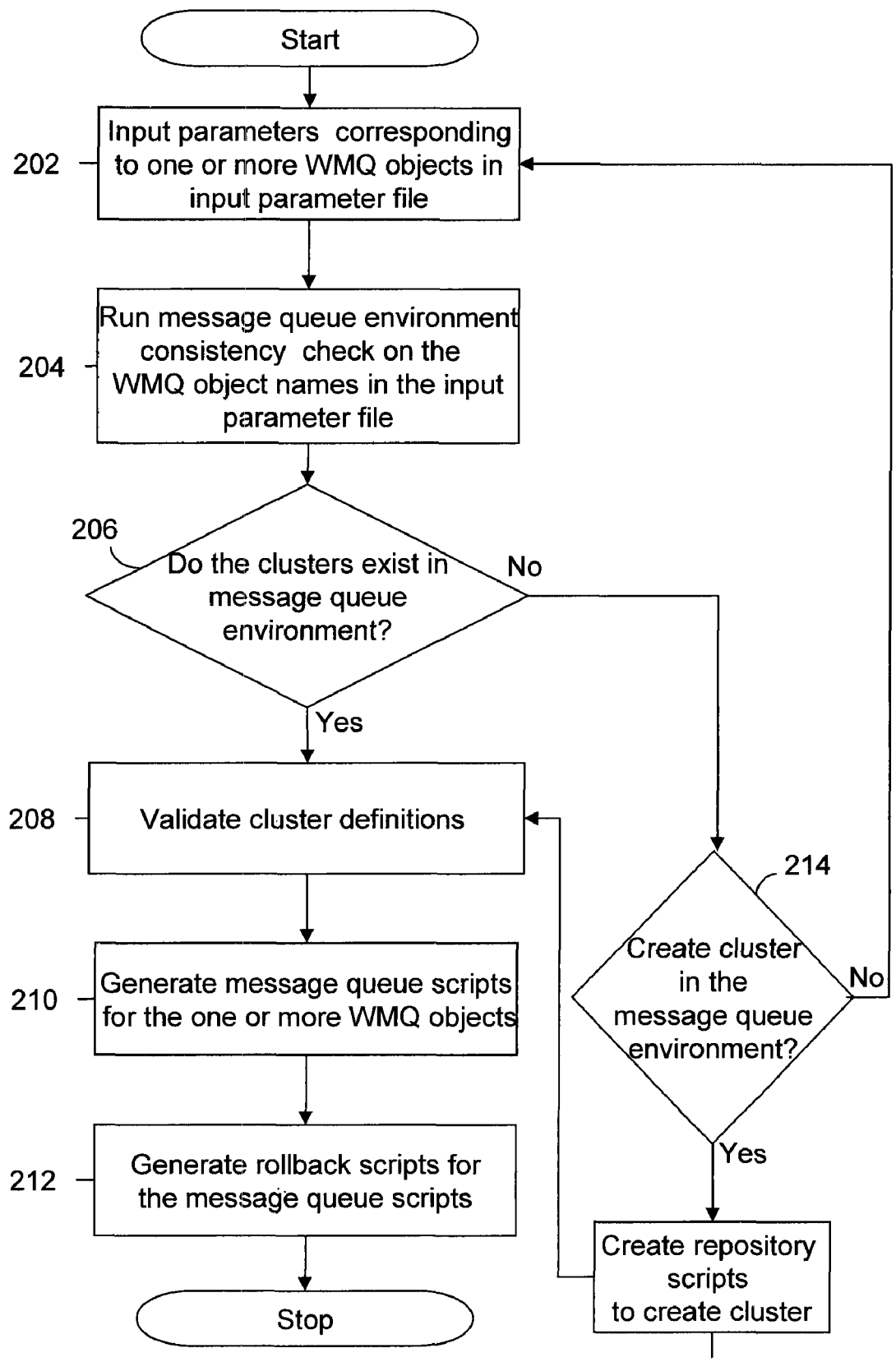
FIG. 2 is a flowchart illustrating a method for generating message queue scripts for one or more queue managers, in accordance with another embodiment of the invention.

FIG. 2 is a flowchart illustrating a method for generating message queue scripts for one or more queue managers, in accordance with another embodiment of the invention. At 202, parameters corresponding to one or more WMQ objects are defined in an input parameter file. The parameters include the names of the WMQ objects and the names of the queue managers on which the WMQ objects need to be defined. Further, the names of one or more clusters corresponding to the queue managers are also defined in the input parameter file. Thereafter, at 204, a message queue environment consistency check is performed on the input parameter file on the basis of the message queue environment information stored in a database. At 204, an attribute constraint check is performed on the parameters of the WMQ objects. The attribute constraint check includes validating the format of the names of the WMQ objects and their respective attributes. The format may include a constraint on the total number of characters in the WMQ object name. For example, a WMQ object 'Cluster Channel' may have a name and attributes defined corresponding to it. Attributes defined for 'Cluster Channel' may include Transport Type (TRPTYPE), Disconnect Interval (DISCINT') and Heartbeat Interval (HBINT). These attributes enable connection parameters to be defined for cluster sender and receiver channels. The attribute constraint check validates the name defined for 'Cluster Channel' and the values defined for the attributes corresponding to the WMQ object. At 206, it is checked if the clusters exist in the message queue environment. If the clusters exist, then at 208, cluster channel definitions are validated. The validation is performed using cluster repositories identified through information in the database. Thereafter, at 210, one or more message queue scripts are generated for the queue managers. The message queue scripts include Message Queue Script (MQSC) commands for creating, modifying or deleting the WMQ objects on the one or more queue managers. For example, a generated message queue script may contain MQSC commands for removing one or more queues from a cluster. The generated message queue script will have the following commands:

```
ALTER QALIAS(REQUEST.QA) CLUSTER(' ')
DELETE QALIAS(REQUEST.QA)
ALTER QLOCAL(REQUEST.INPUT) CLUSTER(' ')
DELETE QLOCAL(REQUEST.INPUT) PURGE
``` wherein 'REQUEST.QA' is the name of an alias queue and 'REQUEST.INPUT' is the name of a local queue that need to be removed. The MQSC commands delete a queue from the corresponding cluster before deleting the queue from the message queue environment. The PURGE command for deleting REQUEST.INPUT indicates that the queue needs to be deleted even if the queue contains any uncommitted messages.

Further, at 212, one or more rollback scripts are generated for each of the one or more message queue scripts. The rollback scripts may be required for rolling back the modifications performed on the one or more queue managers.

At 206, if at least one of the one or more clusters does not exist in the message queue environment, then at 214, it is checked if the user wants to create the at least one cluster. At 216, if the user wants to create the at least one cluster, repository scripts are generated for creating the at least one cluster. If the user does not want to create the cluster, then at 202, the user is given an option to modify the cluster names corresponding to the at least one cluster in the input parameter file.

Figure 3:
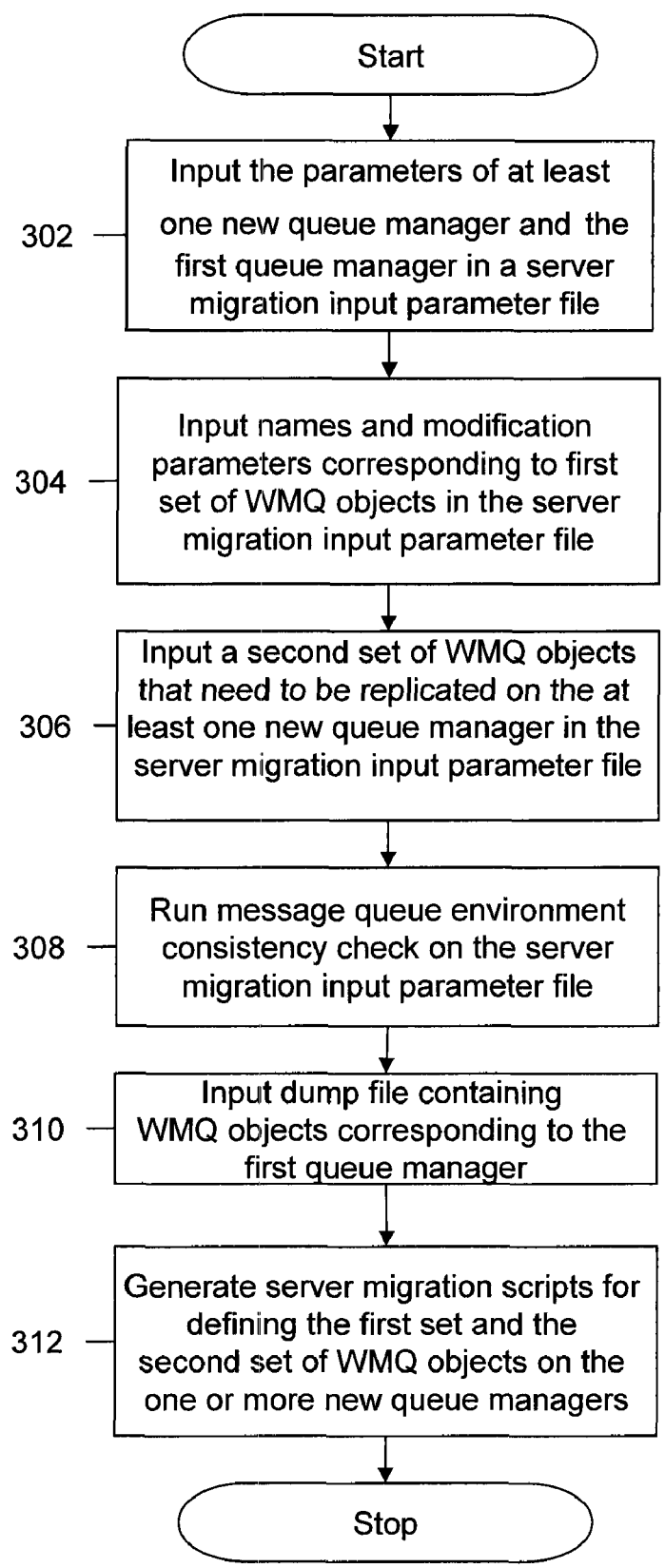
FIG. 3 is a flowchart illustrating a method for generating server migration scripts for the one or more queue managers, in accordance with an embodiment of the invention.

FIG. 3 is a flowchart illustrating a method for generating server migration scripts for the one or more queue managers, in accordance with an embodiment of the invention. The method generates the server migration scripts for replicating or modifying the WMQ objects on at least one queue manager with respect to the WMQ objects corresponding to a first queue manager. In an embodiment of the invention, the server migration scripts may be generated for balancing load in a network. Server migration scripts enable creation of sister queue managers for the first queue manager. The WMQ objects of the sister queue managers are similar to the WMQ objects of the first queue manager. In a network, messages may be serviced by all sister queue managers thereby balancing load across the network. In another embodiment of the invention, the server migration scripts may be generated for moving the first queue manager from one type of server to another type of server. For example, the server migration scripts may be generated for migration of a queue manager from a Linux server to a Solaris server. The server migration scripts facilitate replication of WMQ objects on a sister queue manager and thus aid in migration.

At 302, names of the first queue manager and the at least one queue manager are entered in a server migration input parameter file. Further, the IP address and port numbers corresponding to the at least one queue manager are also entered in the server migration input parameter file. At 304, names and modification parameters corresponding to a first set of WMQ objects are specified, wherein the first set of WMQ objects is to be modified for the at least one queue manager. At 306, a second set of WMQ objects is entered in the server migration input parameter file, wherein the second set of WMQ objects corresponds to the WMQ objects that need to be replicated on the at least one queue manager.

The first set of WMQ objects is modified for the at least one queue manager with respect to the WMQ objects defined for the first queue manager. The modification parameters may include values corresponding to one or more attributes of the WMQ objects. For example, the 'Process' attribute of a WMQ object of type 'Queue Local' defined for the first queue manager may be modified for the at least one queue manager. The second set of WMQ objects include the WMQ objects corresponding to the first queue manager that are replicated on the at least one queue manager. Thus, WMQ objects corresponding to the at least one queue manager are defined using the WMQ objects of the first queue manager.

At 308, a message queue environment consistency check is performed on the server migration input parameter file. The consistency check includes validating names of the queue managers and sets of WMQ objects defined for the server migration. The validation may include running character constraint checks on the names of the WMQ objects. Further, at 310, a dump file containing parameters of WMQ objects corresponding to the first queue manager is provided as input. Thereafter, at 312, server migration scripts are generated to replicate the second set of WMQ objects and modify the first set of WMQ objects on the at least one queue manager. The first set of WMQ objects is modified according to the modification parameters with respect to the WMQ object parameters defined in the dump file.

Figure 4:
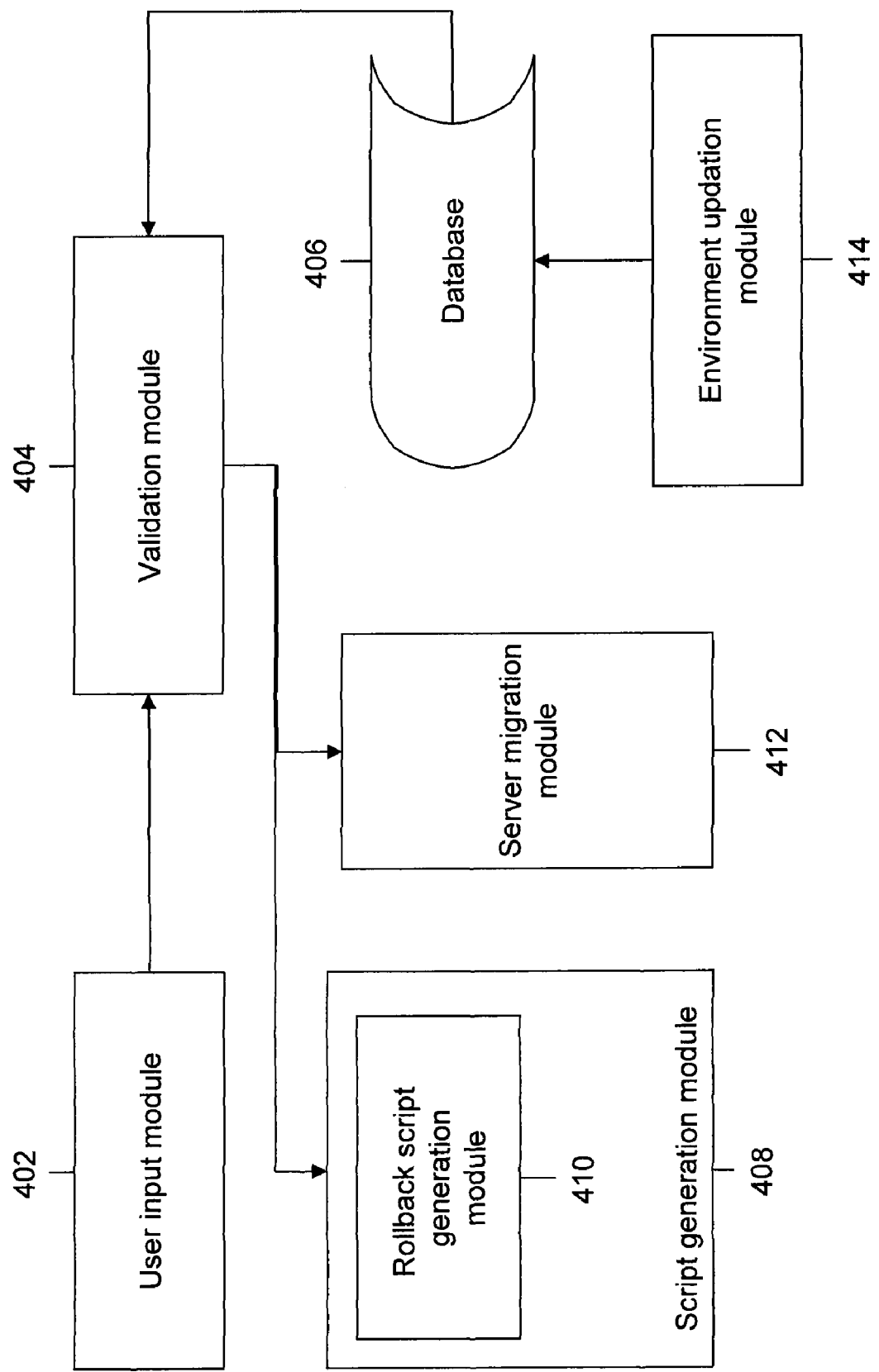
FIG. 4 is a block diagram of a system for generating message queue scripts for one or more queue managers, in accordance with an embodiment of the invention.

FIG. 4 is a block diagram of a system for generating message queue scripts for one or more queue managers, in accordance with an embodiment of the invention. FIG. 4 includes a user input module 402, a validation module 404, a database 406, a script generation module 408, a server migration module 412 and an environment updating module 414. Script generation module 408 includes a rollback script generation module 410.

User input module 402 facilitates a user to enter parameters corresponding to one or more WMQ objects in an input parameter file. In various embodiments of the invention, the parameters include the names of the WMQ objects and the names of one or more queue managers on which the WMQ objects need to be defined. In an embodiment of the invention, the names of one or more clusters may also be defined, wherein the clusters include the queue managers. Thereafter, validation module 404 performs a message queue environment consistency check on the parameters entered in the input parameter file on the basis of message queue environment information stored in database 406. In an embodiment of the invention, the message queue environment consistency check may include an attribute constraint check to be executed on the names of the WMQ objects and the values of attributes corresponding to the WMQ objects. The message queue environment consistency check may also include validating cluster definitions in the input parameter file. After the parameters entered in the input parameter file have been checked for message queue environment consistency, script generation module 408 generates one or more message queue scripts for defining at least one of the one or more WMQ objects on the queue managers. In an embodiment of the invention, the WMQ objects may not be defined on the queue managers if the message queue environment consistency check fails. In another embodiment, one or more WMQ objects that pass the message queue environment consistency check may be defined. Further, rollback script generation module 410 generates one or more rollback scripts corresponding to the one or more message queue scripts.

Thereafter, server migration module 412 generates one or more server migration scripts to define the WMQ objects on at least one queue manager using a first queue manager. The server migration scripts facilitate the replication of WMQ objects corresponding to the first queue manager on the at least one queue manager. In an embodiment of the invention, server migration may be performed to facilitate load balancing in a network.

User input module 402 also facilitates a user to enter the parameters corresponding to the first queue manager and the at least one queue manager in a server migration input parameter file. In various embodiments of the invention, parameters corresponding to a first set and a second set of WMQ objects are defined for modifying and replicating WMQ objects on the at least one queue manager. The first set of WMQ objects corresponds to the WMQ objects that need to be modified for the at least one queue manager with respect to the first queue manager. The first set of WMQ objects are modified according to the modification parameters provided as input. The second set of WMQ objects correspond to the first queue manager and need to be replicated on the at least one queue manager. Further, a dump file containing parameters of WMQ objects corresponding to the first queue manager is also provided as an input. Thereafter, validation module 404 executes a message queue environment consistency check on the server migration input parameter file on the basis of message queue environment information stored in database 406. Validation module 404 validates the parameters corresponding to the first queue manager, the at least one queue manager and the sets of WMQ objects. After successful validation, server migration scripts are generated for replicating the second set of WMQ objects and modifying the first set of WMQ objects for the at least one queue manager. The first set of WMQ objects is modified according to the modification parameters with respect to the WMQ object parameters defined in the dump file.

Environment updating module 414 automatically updates database 406 with information about the message queue environment. The user triggers environment updating module 414 for updating database 406 through a set of dump files of cluster repositories. The repositories contain information about clusters in the message queue environment. Environment updating module 414 parses the set of dump files for information about the clusters defined under the repositories. The cluster information is extracted and updated in database 406. In an embodiment of the invention, environment updating module 414 automatically acquires the set of dump files from a predefined location. In another embodiment of the invention, the set of dump files may be provided as an input to environment updating module 414.

FIG. 5*a*, FIG. 5*b* and FIG. 5*c* illustrate an input parameter file for defining parameters corresponding to the WMQ objects and the queue managers, in accordance with an embodiment of the invention. FIG. 5*a* depicts data corresponding to a queue manager on which the WMQ objects need to be defined. In an embodiment of the invention, the names of the queue managers and the corresponding clusters are defined in the input parameter file. 502 depicts the name of the queue manager and 504 depicts the cluster name corresponding to the queue manager. In an embodiment of the invention, more than one cluster may be defined for the queue manager. In another embodiment of the invention, the IP addresses and the port numbers corresponding to the queue managers may also be defined in the input parameter file.

FIG. 5*b* and FIG. 5*c* depict parameters of the WMQ objects of type 'Queue Alias' and 'Queue Local' respectively. Parameters of the WMQ objects may include names of the WMQ objects, depicted by 506*a*, 506*b*, 508*a* and 508*b*. 506*a* and 506*b* are the names of WMQ objects corresponding to type 'Queue Alias'. 508*a* and 508*b* is the name of a WMQ object corresponding to type 'Queue Local'. Further, one or more attributes corresponding to the WMQ objects may be defined in the input parameter file. The attributes are depicted by 510. In various embodiments of the invention, the attributes defined in the input parameter file are set to the input values. The remaining attributes corresponding to the WMQ objects that are not defined in the input parameter file are set to default values defined by WMQ. For example, the attribute 'Description' for 'QueueLocal01' is set to 'Local queue' and the attribute 'Defbind' may be set to a default value of 'OPEN' specified by WMQ.

The input parameter file is validated for message queue environment consistency using the information stored in the database. FIG. 6 describes the information stored in the database.

Figure 6A:
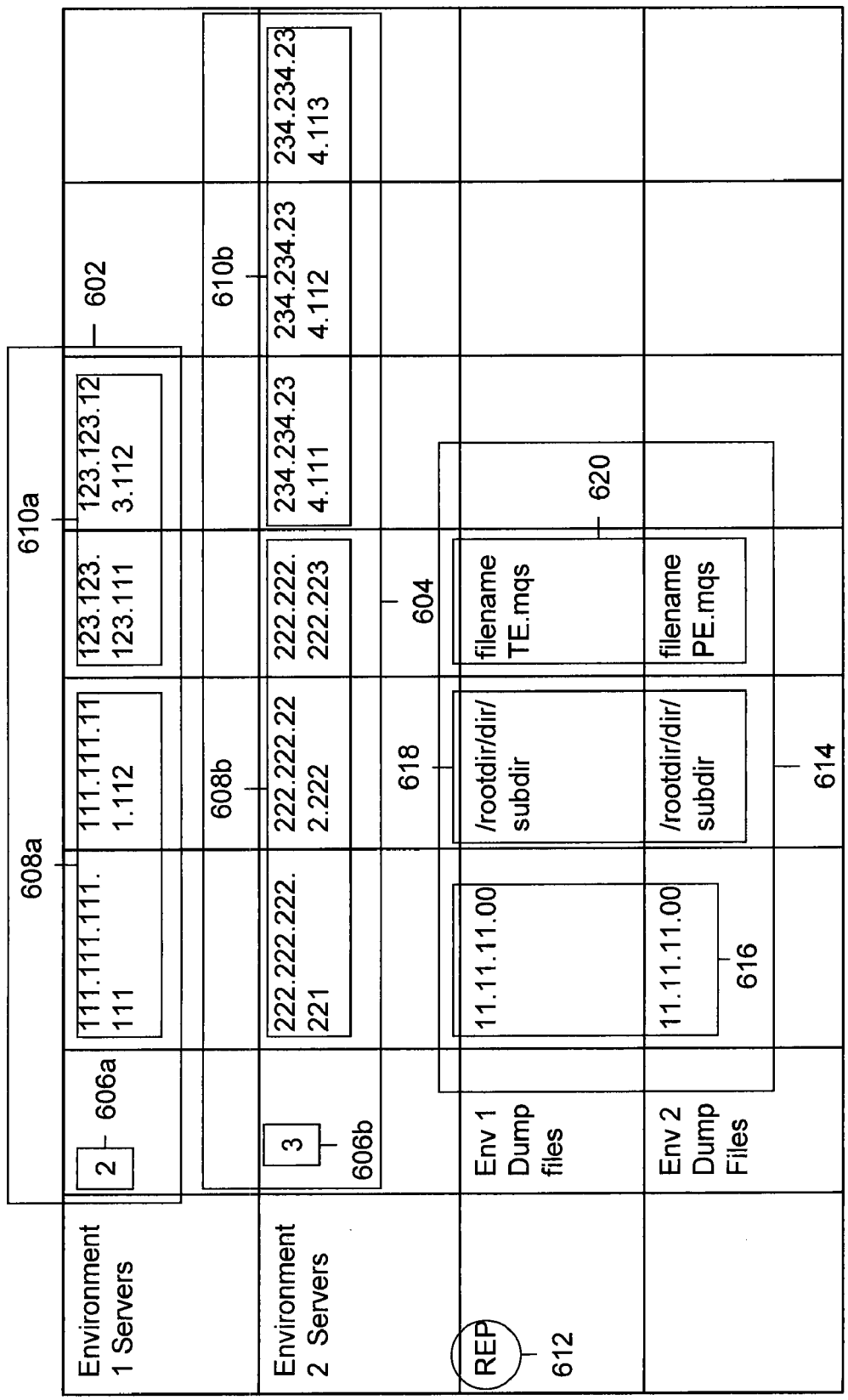

FIG. 6*a*, FIG. 6*b* and FIG. 6*c* illustrate database 406 for storing information about the message queue environment, in accordance with an embodiment of the invention. Database 406 stores information about the message queue environment. FIG. 6*a* depicts information about repository servers corresponding to one or more environments in the message queue environment. In an embodiment of the invention, the one or more environments may include the test environment and the production environment. A repository server corresponding to an environment stores information about the clusters in that environment. The information related to the clusters stored in the repository servers includes, but is not limited to, data about the queue managers on each cluster and the queues managed by each queue manager. 602 depicts information corresponding to an environment for example 'environment 1'. Similarly, 604 depicts information corresponding to another environment for example 'environment 2'. The database stores information regarding the number of repository servers corresponding to each environment and the Internet Protocol (IP) addresses corresponding to the repository servers. Further, the IP addresses of the Domain Name Server (DNS) corresponding to each of the repository servers are also stored. 606*a* and 606*b* depict the number of repository servers for the corresponding environment. For example, environment 1 has two repository servers and environment 2 has three repository servers. The IP addresses corresponding to each of the repository servers are depicted by 608*a* and 608*b*. The DNS IP addresses corresponding to each of the repository servers are depicted as 610*a* and 610*b*.

Further, data related to a repository queue manager corresponding to each environment may also be stored. 612 depicts the name of the repository queue manager corresponding to the Environment 1 and Environment 2. An instance of the repository queue manager may run on each repository server and may store information about all the clusters corresponding to that environment. The cluster information is regularly updated in database 406 through a set of dump files. In an embodiment of the invention, the storage details for the set of dump files may be defined in the database, such as IP address of the server and name of the folder where the set of dump files is stored. 614 depicts information regarding the set of dump files corresponding to each environment. 616 depicts the IP addresses corresponding to the server on which the set of dump files are stored. 618 depicts the path of the folder in which the dump files are stored and 620 depicts the name of the dump file. In another embodiment of the invention, the information corresponding to the set of dump files may not be stored in database 406 and may be provided as an input by the user at the time of updating database 406.

FIG. 6*b* depicts the information extracted from the set of dump files. The names of the clusters present in each environment, extracted from the set of dump files, is updated in database 406. 622 and 624 depict the names of the clusters corresponding to environment 1 and environment 2 respectively.

FIG. 6*c* depicts the list of queue managers present in each environment. The list of queue managers includes repository queue managers for each environment. The repository queue managers store information related to all clusters and queue managers for the corresponding environment. In an embodiment of the invention, the list of queue managers with their respective ports may be updated in the database manually.

In an embodiment of the invention, a group of queue managers may be identified by a High Level Qualifier (HLQ) across the environment. This may be done to standardize the names of queue managers that perform similar tasks. Every queue manager in the group of queue managers may be further identified by a unique second level qualifier. For example, REP is the HLQ and TE11 is the second level qualifier for a queue manager having the name REPTE11.

626 depicts the port numbers corresponding to the repository queue managers for each environment. For example, 101 is the port number of a queue manager having the name REPTE11. Further, port numbers corresponding to queue managers in each cluster are also stored in database 406. The HLQ for the queue managers are depicted by 628 and their corresponding port numbers are depicted by 630.

In an embodiment of the invention, a HLQ may be defined in the input parameter file instead of the full name of a queue manager for defining similar WMQ objects on the group of queue managers identified by the HLQ.

Figure 7A:
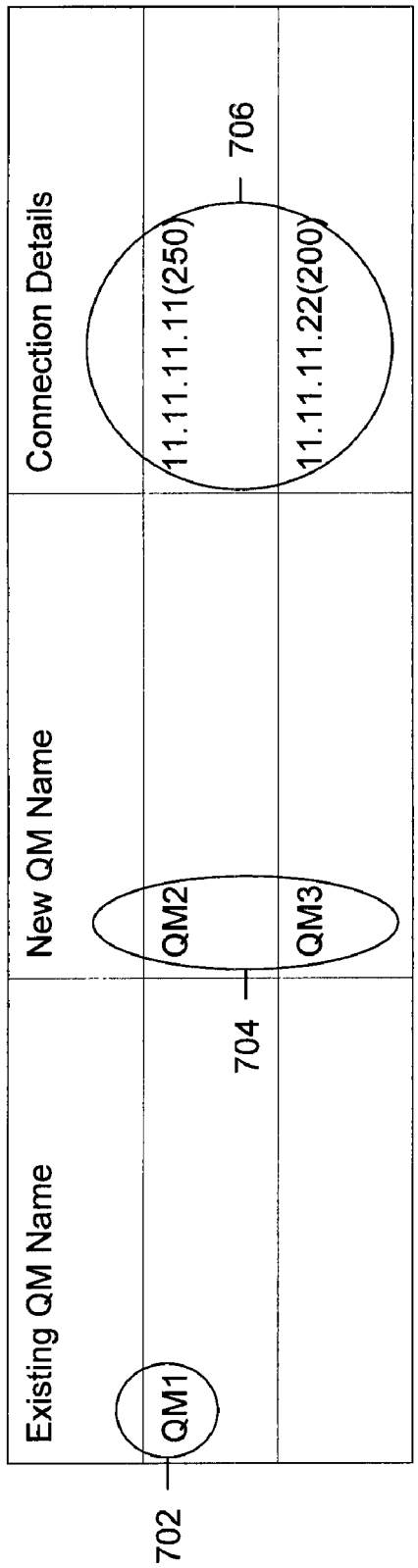
FIGS. 7a and 7b illustrate a server migration input file for defining parameters for server migration, in accordance with an embodiment of the invention.
Figure 7B:
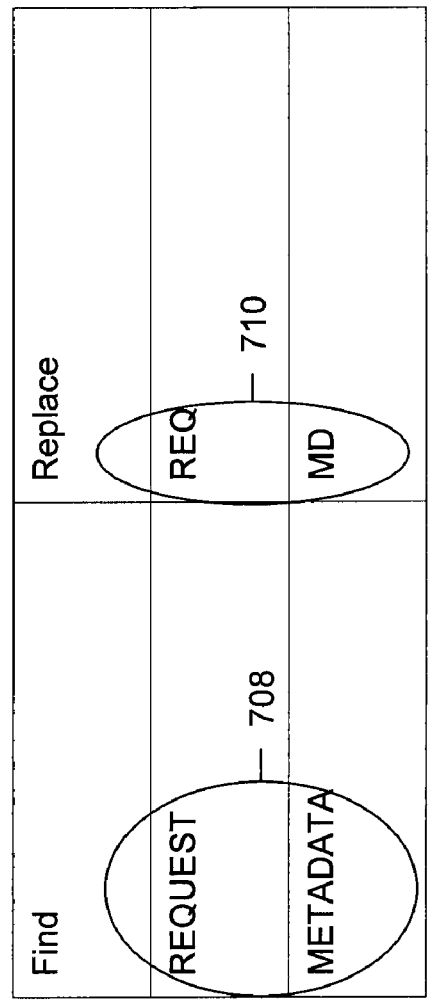

FIG. 7a and FIG. 7b illustrate a server migration input file for defining parameters for server migration, in accordance with an embodiment of the invention. The server migration input parameter file contains details about a first queue manager and at least one queue manager. The connection details corresponding to the at least one queue manager are also defined in the server migration input parameter file. Connection details may include the IP addresses and port numbers for the at least one queue manager. The server migration input parameter file enables the user to generate server migration scripts for defining one or more WMQ objects on the at least one queue manager using the first queue manager. 702 depicts the name of the first queue manager. The names of the at least one queue manager are depicted by 704 and the connection details corresponding to the at least one queue manager are depicted by 706.

A dump file (not shown in the figures) containing the parameters of the WMQ objects corresponding to the first queue manager is also provided as an input for server migration.

FIG. 7b depicts data corresponding to the first and second set of WMQ objects to be defined on the at least one queue manager. The first set of WMQ objects include the WMQ objects that are to be modified on the at least one queue manager with respect to the WMQ objects for the first queue manager. The second set of WMQ objects include the WMQ objects corresponding to the first queue manager and need to be replicated on the at least one queue manager. Strings that are searched in the dump file are specified in the server migration input parameter file. Further, modification parameters including replacement strings corresponding to the searched strings are also specified in the server migration input parameter file. Thereafter, the first set of WMQ objects is modified using the modification parameters. Subsequently, the modified first set of WMQ objects is defined on the at least one queue manager.

708 depicts a list of search strings that need to be searched in the dump file. 710 depicts replacement strings corresponding to each of the search strings. The replacement strings are used to modify the searched strings in the WMQ objects for the at least one queue manager.

The second set of WMQ objects corresponding to the first queue manager is replicated on the at least one queue manager. The second set of WMQ objects may include one or more of the remaining WMQ objects that are included in the dump file and are not included in the first set of WMQ objects.

In an embodiment of the invention, one or more WMQ objects for the first queue manager may be selected for migration to the at least one queue manager. The names of the WMQ objects may be specified along with the modification parameters. In this case, the second set of WMQ objects may not be specified. The remaining WMQ objects corresponding to the first queue manager are replicated on the at least one queue manager.

Figure 8:
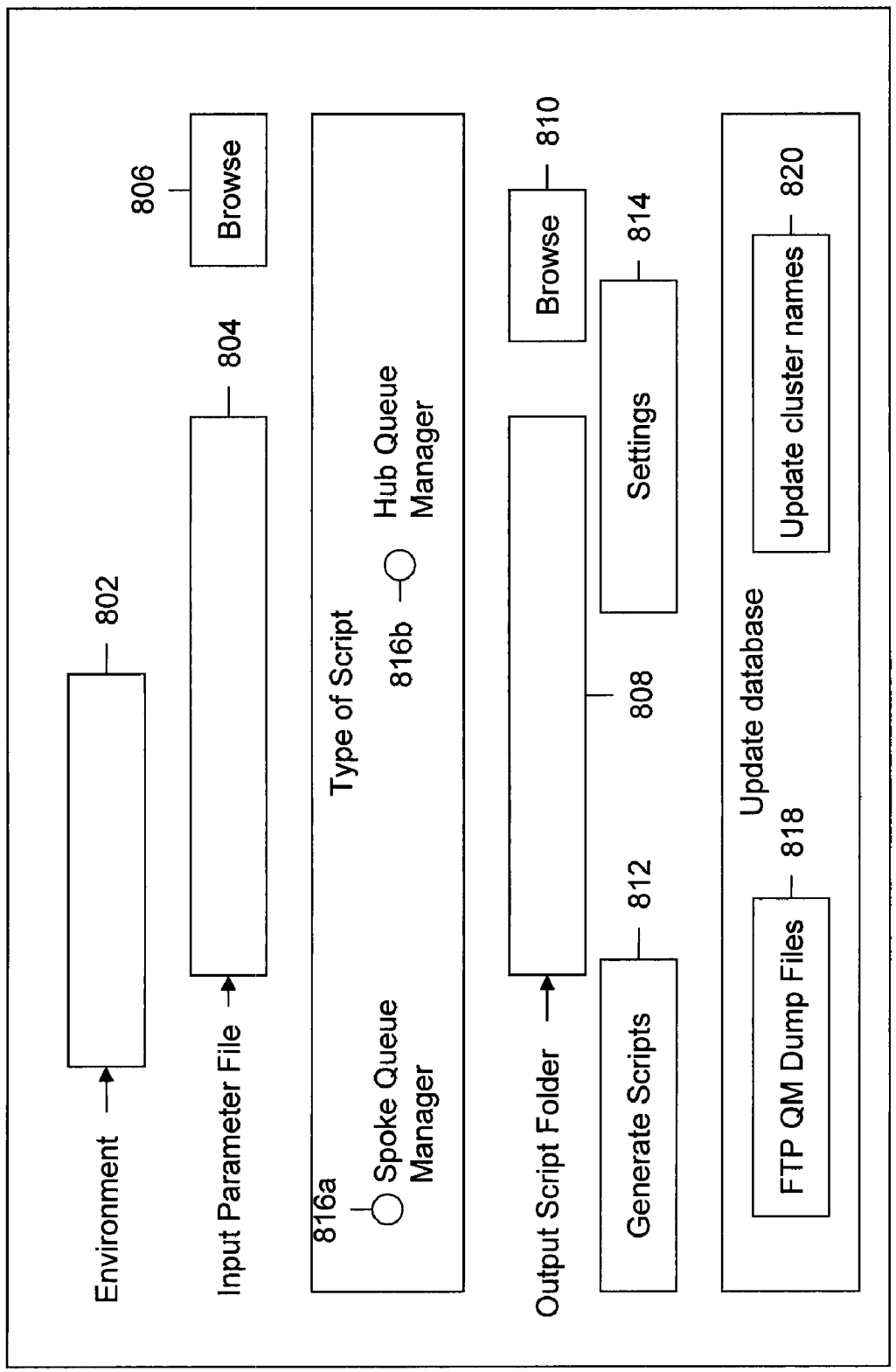
FIG. 8 is a block diagram of a user input module, in accordance with an embodiment of the invention.

FIG. 8 is a block diagram of user input module 402, in accordance with an embodiment of the invention. FIG. 8 includes a plurality of textboxes 802, 804 and 808, a plurality of buttons 806, 810, 812, 814, 818 and 820.

User input module 402 facilitates a user to enter parameters corresponding to the WMQ objects and the queue managers in the input parameter file. In an embodiment of the invention with one or more environments, the name of the environment is entered in textbox 802. In another embodiment of the invention, there may be only one environment for which the scripts are generated. The input parameter file for defining parameters corresponding to the WMQ objects and the queue managers is input in textbox 804. The input parameter file may be uploaded using browse button 806. Further, folder for storing one or more generated message queue scripts is specified in textbox 808. The path of the folder may be specified using browse button 810.

Further, the type of the input parameter file may be specified using radio button 816a and 816b. The type of input parameter file may be different for a hub queue manager, represented by 816b and a spoke queue manager, represented by 816a.

In a message queue environment, two or more applications running on different servers may need to communicate with each other. Thus, in order to communicate, the applications may connect to queue managers running on different servers. These queue managers are called 'spoke queue managers'. However, the spoke queue managers may be running on different platforms or employing different message formats. In such a scenario, one or more hub queue managers act as mediators and facilitate conversion of messages from one format to the other. In another embodiment of the invention, one or more hub queue managers may facilitate intelligent routing in the network. Messages may be routed to one or more spoke managers by the hub queue managers on the basis of the data elements carried by the messages. Naming conventions of hub and spoke queue managers may vary across different message queue environments. Hence, the type of the input parameter file needs to be specified for creating the message queue scripts.

In an embodiment of the invention, the input parameter file for defining the WMQ objects on a spoke queue manager may contain the complete name of the queue manager and the corresponding IP address. In an embodiment of the invention, the input parameter file for defining the WMQ objects on a hub queue manager may include the HLQ corresponding to the hub queue manager. One or more hub queue managers may be identified by the same HLQ.

Thereafter, a message queue consistency check is performed on the input parameter file by clicking on button 812. The message queue consistency check is performed by validation module 404 using the information stored in a database, such as database 406. If the attribute constraint check on the parameters of the WMQ objects fails, an error notification is generated and displayed to the user. If the name of a cluster is specified incorrectly, the user is given the option to create a new cluster. When the input parameter file has been validated for message queue consistency, one or more message queue scripts are generated by script generation module 408 to define at least one of the one or more WMQ objects on the one or more queue managers. One or more rollback scripts corresponding to each of the one or more message queue scripts are also generated by rollback script generation module 410. In another embodiment of the invention, no message queue scripts may be generated if the attribute constraint check fails for one or more WMQ objects.

A user may set one or more WMQ objects to default values using button 814. Thereafter, the default settings are applied to the generation of each message queue script for defining the WMQ objects for the queue managers. The default settings may include setting one or more attributes corresponding to the one or more WMQ objects to default values. This is explained in detail in FIG. 9.

Further, the database may be updated by a set of dump files. The set of dump files may be acquired from the location updated in the database by clicking on button 818. The set of dump files may be transferred by using File Transfer Protocol (FTP). By clicking on button 820, environment updating module 414 parses the set of dump files for cluster information and extracts the relevant information. The cluster names are accordingly updated in the database.

Figure 9:
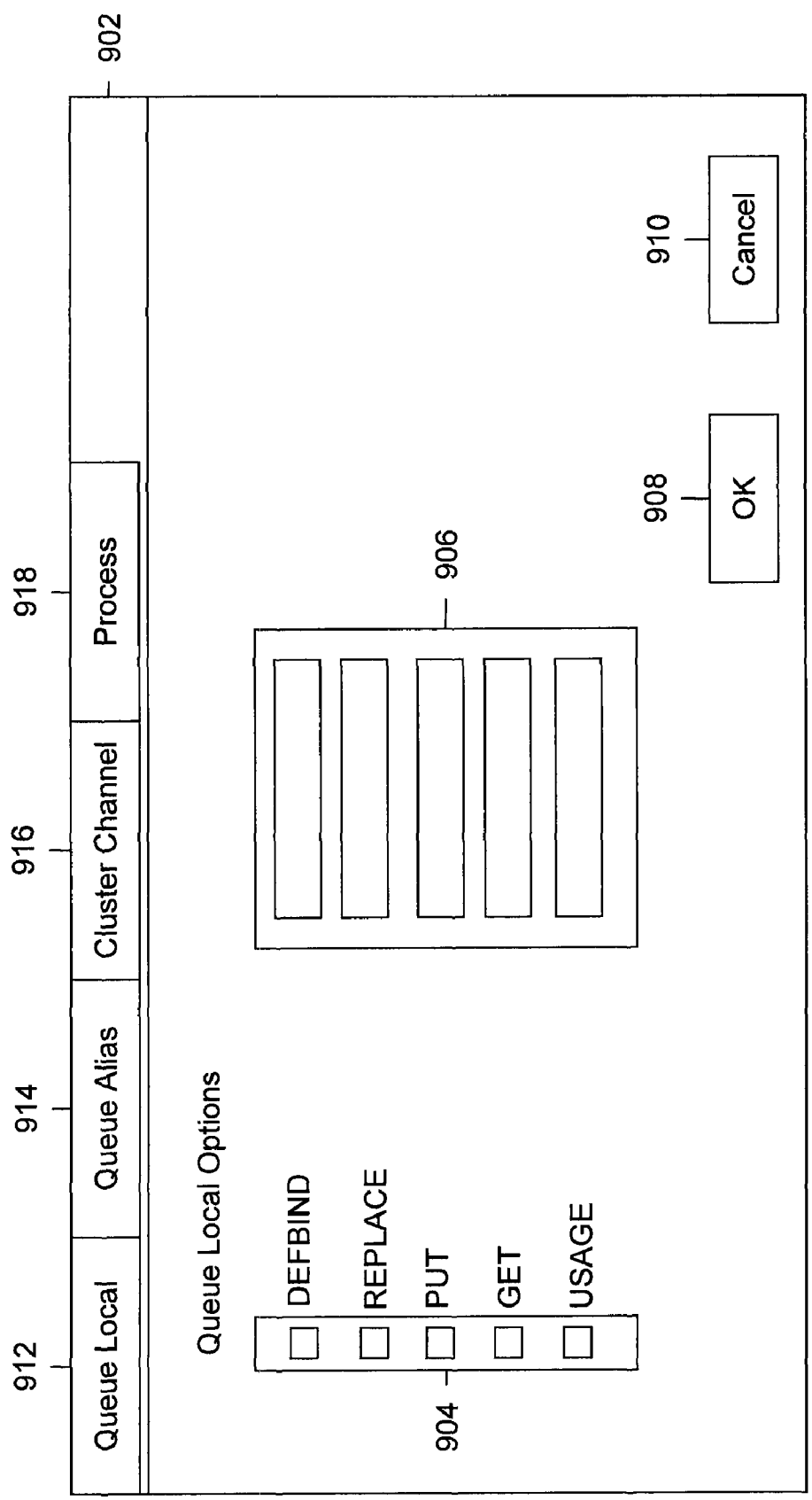
FIG. 9 illustrates the default settings that may be set by a user for defining one or more WMQ objects on a queue manager, in accordance with an embodiment of the invention.

FIG. 9 illustrates the default settings that may be set by a user for defining the WMQ objects on a queue manager, in accordance with an embodiment of the invention. FIG. 9 includes a menu bar 902, a plurality of checkboxes 904, a plurality of textboxes 906 and a plurality of buttons 908 and 910. Menu bar 902 includes a plurality of tabs 912, 914, 916 and 918.

Menu bar 902 includes at least one of the WMQ objects that need to be defined on the queue managers. Default settings may be set for the WMQ objects by clicking on the respective tab for the WMQ objects. For example, the settings for WMQ object 'Queue Local' may be set by clicking on Queue Local tab 912. Thereafter, attributes corresponding to the WMQ object may be set to default values by clicking on checkbox 904 and entering a default value corresponding to the selected attribute in corresponding textbox 906. Further, the user may submit the entered default values by clicking on button 908. The default values can be cancelled by clicking on button 910.

Similarly, default settings may be set for WMQ object of the type 'Queue Alias', 'Cluster Channel' and Process by clicking on their respective tabs depicted by 914, 916 and 918 respectively.

If different values for one or more attributes corresponding to the WMQ objects are defined through default settings and in the input parameter file, one value may override the other. In an embodiment of the invention, the default settings may override the values entered in the input parameter file. In another embodiment of the invention, the values entered in the input parameter file may override the default settings.

Figure 10:
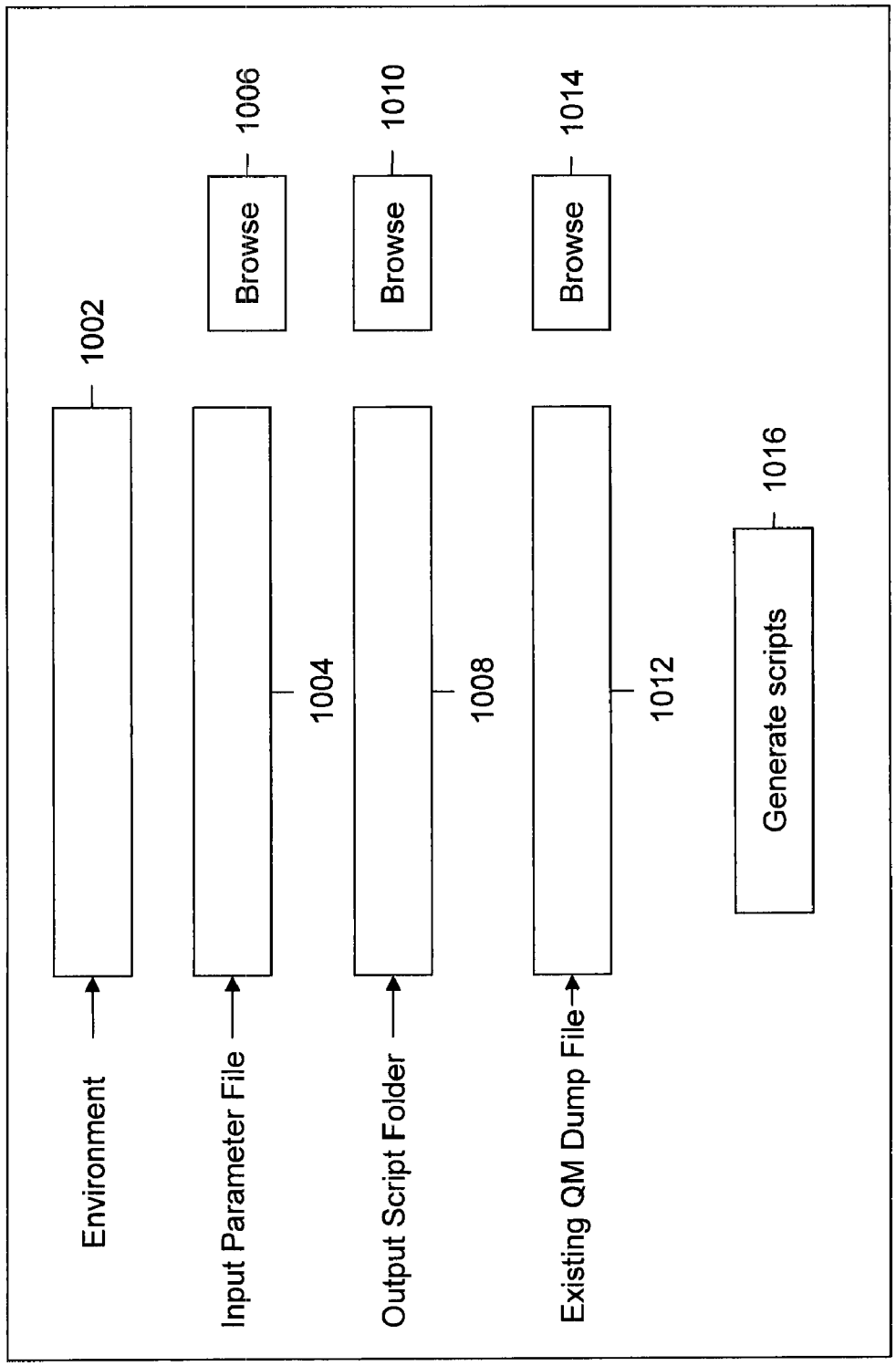
FIG. 10 is a block diagram of a user input module for defining parameters for server migration, in accordance with another embodiment of the invention.

FIG. 10 is a block diagram of user input module 402 for defining parameters for server migration, in accordance with another embodiment of the invention. FIG. 10 includes a plurality of textboxes 1002, 1004, 1008 and 1012, a plurality of buttons such as browse buttons 1006, 1010, 1014 and a generate scripts button 1016. Server migration module 412 generates server migration scripts for defining one or more WMQ objects on at least one queue manager using a first queue manager, using inputs received from user input module 402.

In an embodiment of the invention, wherein there are one or more environments, the name of the relevant environment is entered in textbox 1002. The input parameter file for defining parameters for server migration is entered in textbox 1004. The input parameter file may be uploaded using browse button 1006. Further, the path of a folder for storing the one or more server migration scripts is specified in textbox 1008. The path of the folder may be specified using browse button 1010. Further, the path of a dump file with specified parameters of the WMQ objects corresponding to the first queue manager is entered in textbox 1012. The path of the folder may be specified using browse button 1014. Thereafter, server migration scripts are generated by clicking on generate scripts button 1016.

Figure 11A:
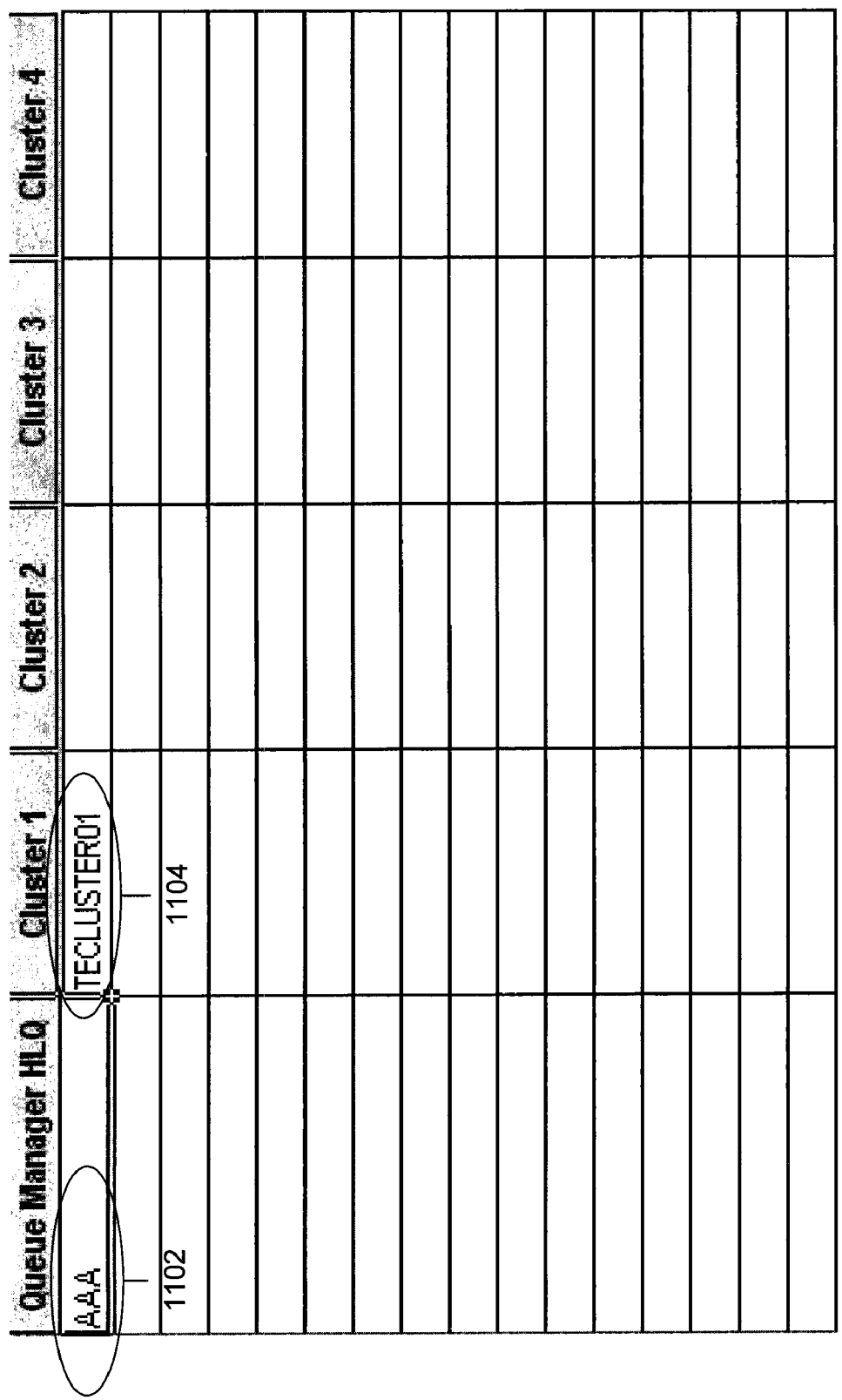

FIG. 11a and FIG. 11b is a screenshot of an input parameter file for defining parameters corresponding to the one or more WMQ objects and the one or more queue managers, in accordance with an exemplary embodiment of the invention.

FIG. 11a depicts the name of the queue manager and corresponding cluster name for the queue manager provided as an input in the input parameter file. 1102 depicts the name of the queue manager and 1104 depicts the name of the cluster.

FIG. 11b depicts the parameters corresponding to a WMQ object of type 'Queue Alias' required for defining the WMQ object on the queue manager. 1106 depicts the name of WMQ object of type 'Queue Alias'. 1108 depicts the attributes defined for the WMQ object. For example an attribute having the name 'Description' corresponding to WMQ object 'Request.Qa' is defined as 'Alias queue for request'.

Figure 12:
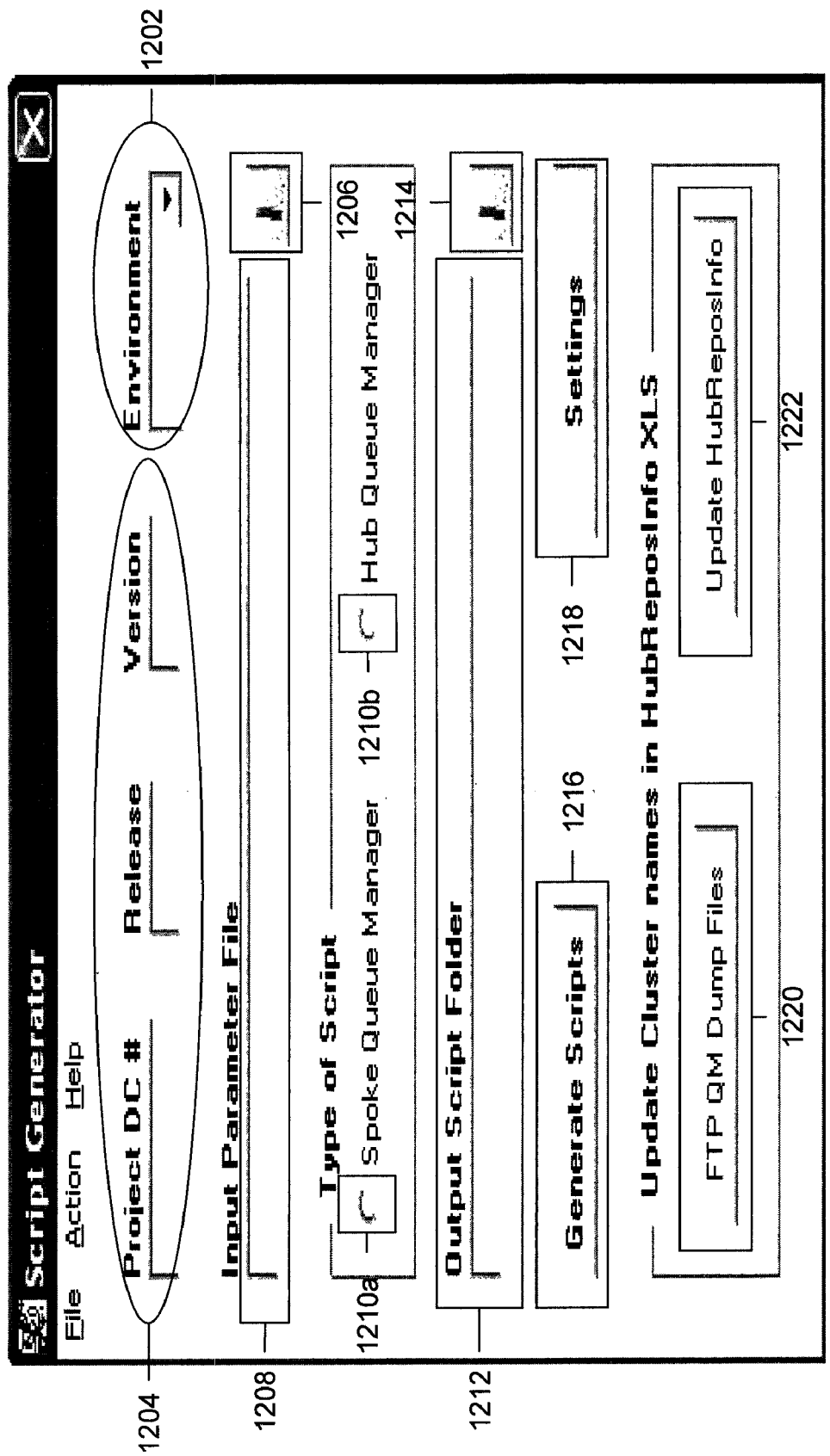
FIG. 12 is a screenshot of a user input module for defining parameters corresponding to the WMQ objects and the queue managers, in accordance with an exemplary embodiment of the invention.

FIG. 12 is a screenshot of a user input module for defining parameters corresponding to the WMQ objects and the queue managers, in accordance with the exemplary embodiment of the invention. The user input module includes a plurality of textboxes 1202, 1204, 1208 and 1212, a plurality of buttons 1206, 1210, 1214, 1216, 1218, 1220 and 1222.

The name of the environment for which the message queue scripts need to be generated is inputted in textbox 1202. The environment is selected from one or more environments available in a drop-down menu. For example, an environment may be selected from a drop-down menu including 'Test Environment', 'Production Environment' and 'Quality Assurance Environment'. 1204 depicts a plurality of textboxes for entering information related to the version of the computer code employed to implement the user input module. The name of the input parameter file is entered in textbox 1208. The input parameter file may be uploaded by clicking on browse button 1206. Similarly, the name of the output folder in which the message queue scripts are required to be generated is entered in textbox 1212. The name may be entered by clicking on button 1214 and selecting the corresponding folder. Further, the type of queue manager may be selected by clicking on radio buttons 1210a and 1210b corresponding to a spoke queue manager and a hub spoke queue manager respectively. Thereafter, a message queue environment consistency check is performed on the input parameter file using information in the database by clicking on button 1216. After the input parameter file has been checked for consistency, message queue scripts are generated. Attributes corresponding to one or more of the one or more WMQ objects may be set to default values by clicking on button 1218. Further, the database may be updated through a set of dump files by clicking on button 1222. The set of dump files may be acquired from the specified location in the database by clicking on button 1220.

FIG. 13 is a screenshot of a generated message queue script, in accordance with the exemplary embodiment of the invention. FIG. 13 depicts a message queue script containing MQSC commands for defining message receiver and sender channels to queue managers. The message queue script defines WMQ object 'Channel' on the queue manager.

The method, system and computer program product described above have a number of advantages. The method generates message queue scripts for defining one or more WMQ objects on one or more queue managers. A user is required to define parameters corresponding to the one or more WMQ objects and the one or more queue managers. Further, the user is required to provide the name of the corresponding cluster in case of clustered object definitions. The connection details of the queue manager including the IP address and port number need not be input by the user and may be acquired by referring to a database that stores information about the message queue environment. Thus, the method automates the generation of message queue scripts and reduces manual intervention. Further, the input parameter file is validated for message queue environment consistency and an error notification is displayed in case an incorrect definition has been input. The validation reduces manual effort and ensures that the WMQ objects are defined on the queue managers in a consistent manner. Moreover the method also generates fallback scripts for rolling back modifications performed on the one or more queue managers.

The system for generating message queue scripts for defining the WMQ objects on the queue managers, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for determining a reuse factor associated with a set of resources available for a project. The computer program product includes a computer usable medium having a set program instructions comprising a program code for determining a reuse factor associated with a set of resources available for a project. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

What is claimed is:

1. A method for automatically generating one or more message queue scripts for one or more queue managers in a plurality of message queue environments for enabling communication between a plurality of applications, the method comprising:
   a. facilitating a user to select a message queue environment from a drop-down menu displaying the plurality of message queue environments;
   b. facilitating the user to select a predefined type of an input parameter file for defining parameters of one or more Message Queue (MQ) objects and the one or more queue managers, wherein the parameters and the one or more queue managers correspond to the selected message queue environment;
   c. automatically acquiring Internet Protocol (IP) address and port numbers of the one or more queue managers, corresponding to the selected message queue environment, from a database comprising information pertaining to the selected message queue environment;
   d. receiving, from the user, the parameters of the one or more MQ objects and the one or more queue managers as input in the selected predefined type of the input parameter file;
   e. performing a message queue environment consistency check to validate the parameters received in the selected predefined type of the input parameter file, wherein the message queue environment consistency check is based on the information stored in the database pertaining to the selected message queue environment; and
   f. generating one or more message queue scripts for defining at least one of the one or more MQ objects when the message queue environment consistency check is validated.

2. The method of claim 1, wherein receiving parameters comprise receiving names of the one or more MQ objects as input in the selected predefined type of the input parameter file.

3. The method of claim 1 further comprising providing names of one or more clusters as input in the selected predefined type of the input parameter file, wherein each of the one or more clusters comprise at least one of the one or more queue managers.

4. The method of claim 3, wherein performing the message queue environment consistency check further comprises validating the one or more cluster names provided as input.

5. The method of claim 4 further comprising generating one or more repository scripts when the one or more clusters do not exist, wherein the one or more repository scripts are generated to setup the one or more clusters.

6. The method of claim 1 further comprising automatically updating information about the selected message queue environment in the database through a set of dump files.

7. The method of claim 1 further comprising generating one or more rollback scripts corresponding to the one or more message queue scripts.

8. A method for automatically generating one or more server migration scripts for defining one or more Message Queue (MQ) objects of a first queue manager on a second queue manager in a plurality of message queue environments, the method comprising:
   a. facilitating a user to select a message queue environment from a drop-down menu displaying the plurality of message queue environments;
   b. facilitating the user to select a predefined type of an input parameter file for:
      entering names of the first queue manager and the second queue manager, wherein the first and the second queue manager correspond to the selected message queue environment; and
      defining parameters of MQ objects of the first queue manager, wherein the parameters correspond to the selected message queue environment and are to be replicated on the second queue manager;

c. automatically acquiring Internet Protocol (IP) address and port numbers of the first queue manager and the second queue manager, corresponding to the selected message queue environment, from a database comprising information pertaining to the selected message queue environment;

d. receiving names of the first queue manager, the second queue manager, and the parameters of MQ objects of the first queue manager as input in the selected predefined type of the input parameter file;

e. performing a message queue environment consistency check to validate the names of the first and the second queue managers, and the parameters received in the selected predefined type of the input parameter file, wherein the message queue environment consistency check is based on the information stored in the database pertaining to the selected message queue environment; and f. generating one or more server migration scripts for replicating the MQ objects defined for the first queue manager on the second queue manager when the message queue environment consistency check is validated.

9. A computer program product for use with a computer, the computer program product comprising a non-transitory computer usable medium having a computer readable program code embodied therein for generating one or more message queue scripts for one or more queue managers in a plurality of message queue environments for enabling communication between a plurality of applications, the computer readable program code performing:

a. facilitating a user to select a message queue environment from a drop-down menu displaying the plurality of message queue environments;

b. facilitating the user to select a predefined type of an input parameter file for defining parameters of one or more Message Queue (MQ) objects and the one or more queue managers, wherein the parameters of the one or more MQ objects, and the one or more queue managers correspond to the selected message queue environment;

c. automatically acquiring Internet Protocol (IP) address and port numbers of the one or more queue managers, corresponding to the selected message queue environment, from a database comprising information pertaining to the selected message queue environment;

d. receiving, from the user, the parameters of the one or more MQ objects and the one or more queue managers as input in the selected predefined type of the input parameter file;

e. performing a message queue environment consistency check to validate the parameters received in the selected predefined type of the input parameter file, wherein the message queue environment consistency check is based on the information stored in the database pertaining to the selected message queue environment; and f. generating one or more message queue scripts for defining at least one of the one or more MQ objects when the message queue environment consistency check is validated.

10. The computer program product of claim 9, wherein the computer readable program code further performs enabling the user to provide names of one or more clusters as input, wherein each of the one or more clusters comprise at least one of the one or more queue managers.

11. The computer program product of claim 10, wherein the computer readable program code further performs enabling the user to generate one or more repository scripts when the one or more clusters do not exist, wherein the one or more repository scripts are generated to setup the one or more clusters.

12. The computer program product of claim 9, wherein the computer readable program code further performs updating information related to the selected message queue environment in the database through a set of dump files.

13. The computer program product of claim 9, wherein the computer readable program code further performs generating one or more rollback scripts corresponding to the one or more message queue scripts.

14. A computer program product for use with a computer, the computer program product comprising a non-transitory computer usable medium having a computer readable program code embodied therein for generating one or more server migration scripts for defining one or more Message Queue (MQ) objects of a first queue manager on a second queue manager in a plurality of message queue environments, the computer readable program code performing:

a. facilitating a user to select a message queue environment from a drop-down menu displaying the plurality of message queue environments;

b. facilitating the user to select a predefined type of an input parameter file for:
  entering names of the first queue manager and the second queue manager, wherein the first and the second queue manager correspond to the selected message queue environment; and
  defining parameters of MQ objects of the first queue manager, wherein the parameters correspond to the selected message queue environment and are to be replicated on the second queue manager;

c. automatically acquiring Internet Protocol (IP) address and port numbers of the first queue manager and the second queue manager, corresponding to the selected message queue environment, from a database comprising information pertaining to the selected message queue environment;

d. receiving, from the user, names of the first queue manager, the second queue manager, and the parameters of MQ objects of the first queue manager as input in the selected predefined type of the input parameter file;

e. performing a message queue environment consistency check to validate the names of the first and the second queue managers, and the parameters received in the selected predefined type of the input parameter file, wherein the message queue environment consistency check is based on the information stored in the database pertaining to the selected message queue environment; and f. generating one or more server migration scripts for replicating the MQ objects defined for the first queue manager on the second queue manager when the message queue environment consistency check is validated.

15. A system for automatically generating one or more message queue scripts for one or more queue managers in a plurality of message queue environments for enabling communication between a plurality of applications, the system comprising:

a microprocessor and a memory, the system further comprising:

a. a user input module configured for
  facilitating a user, using the microprocessor, to select a message queue environment from a drop-down menu displaying the plurality of message queue environments facilitating the user, using the microprocessor, to select a predefined type of an input parameter file for defining parameters of one or more Message Queue (MQ) objects and the one or more queue managers, wherein the parameters of the one or more MQ objects, and the one or more queue managers correspond to the selected message queue environment;

enabling the user, the microprocessor, to provide the parameters for the one or more MQ objects and the one or more queue managers as input in the selected predefined type of the input parameter file;

automatically acquiring, using the microprocessor, Internet Protocol (IP) address and port numbers of the one or more queue managers, corresponding to the selected message queue environment, from a database comprising information pertaining to the selected message queue environment;

b. a validation module configured for validating, using the microprocessor, the parameters received in the selected predefined type of the input parameter file by performing a message queue environment consistency check, wherein the message queue environment consistency check is based on information stored in the database pertaining to the selected message queue environment; and c. a script generation module configured for, using the microprocessor, generating one or more message queue scripts for defining at least one of the one or more MQ objects on the one or more queue managers when the message queue environment consistency check is validated.

16. The system of claim 15, wherein the script generation module comprises a rollback script generation module configured for generating one or more rollback scripts corresponding to the one or more message queue scripts.

17. The system of claim 15 further comprising an environment updating module configured for updating the database with information related to the selected message queue environment.

18. The system of claim 15 further comprising a server migration module configured for generating, when the message queue environment consistency check is validated, one or more server migration scripts, wherein the one or more server migration scripts facilitate replication of MQ objects corresponding to a first queue manager of the one or more queue managers on a second queue manager of the one or more queue managers in the selected message queue environment.

* * * * *